United States Patent
David et al.

(10) Patent No.: US 10,243,500 B2
(45) Date of Patent: Mar. 26, 2019

(54) METHOD TO REDUCE ELECTROMAGNETIC INTERFERENCE IN SWITCHING CIRCUIT APPLICATIONS

(71) Applicant: EATON CORPORATION, Cleveland, OH (US)

(72) Inventors: James David, Portage, MI (US); Bharath Kumar Suda, Kharadi (IN); Asheesh Soni, Pune (IN)

(73) Assignee: Eaton Intelligent Power Limited, Dublin (IE)

(*) Notice: Subject to any disclaimer, the term of this patent is extended or adjusted under 35 U.S.C. 154(b) by 0 days.

(21) Appl. No.: 15/567,584

(22) PCT Filed: Apr. 20, 2016

(86) PCT No.: PCT/US2016/028528
§ 371 (c)(1),
(2) Date: Oct. 18, 2017

(87) PCT Pub. No.: WO2016/172271
PCT Pub. Date: Oct. 27, 2016

(65) Prior Publication Data
US 2018/0123499 A1    May 3, 2018

(51) Int. Cl.
*H02P 6/00* (2016.01)
*H02P 27/08* (2006.01)
(Continued)

(52) U.S. Cl.
CPC ............ *H02P 27/085* (2013.01); *H04L 25/03* (2013.01); *H04L 25/4902* (2013.01); *H02M 7/53871* (2013.01); *H02P 2207/05* (2013.01)

(58) Field of Classification Search
CPC .... H02P 27/08; H02P 6/06; H02P 6/08; H02P 27/085
See application file for complete search history.

(56) References Cited

U.S. PATENT DOCUMENTS 6,674,789 B1    1/2004 Fardoun et al.
6,807,074 B2    10/2004 Olila et al.
(Continued)

FOREIGN PATENT DOCUMENTS

KR    101434047 B1    8/2014

OTHER PUBLICATIONS

International Search Report for PCT/US2016/028528 dated Aug. 1, 2016, pp. 1-3.
(Continued)

*Primary Examiner* — Karen Masih
(74) *Attorney, Agent, or Firm* — Mei & Mark LLP (57) ABSTRACT

A method for providing electromagnetic compatibility to a motor control circuit is provided. A base pulse width modulated signal is selected to apply to a motor control circuit, and comprises a duty cycle for controlling an affiliated motor. Sensed system conditions are inputted for selecting a hopping frequency and a hopping amplitude of an electro magnetic compatibility management signal. The hopping frequency and the hopping amplitude are overlayed on to the base pulse width modulated signal to create a control pulse width modulated signal. The hopping frequency dithers the frequency of the control pulse width modulated signal. The hopping amplitude restricts the amplitude of the frequency dither.

20 Claims, 7 Drawing Sheets

(51) Int. Cl.
*H04L 25/03* (2006.01)
*H04L 25/49* (2006.01)
*H02M 7/5387* (2007.01)

(56) References Cited

U.S. PATENT DOCUMENTS

| | | |
|---|---|---|
| 7,099,165 B1 | 8/2006 | Rozman |
| 9,035,590 B2 | 5/2015 | Lee |
| 9,054,588 B2 | 6/2015 | Takata et al. |
| 2014/0001992 A1* | 1/2014 | Yang .................. H02P 27/085 318/400.25 |
| 2014/0049194 A1 | 2/2014 | Eggeling et al. |
| 2014/0145662 A1 | 5/2014 | Lee |
| 2015/0048771 A1 | 2/2015 | Caillaud et al. |
| 2017/0126272 A1* | 5/2017 | Kwon .................. H04L 1/0071 |
| 2017/0199396 A1* | 7/2017 | Knoll .................... G02C 7/101 |
| 2017/0366130 A1* | 12/2017 | Hollenbeck ........... H02P 27/085 |

OTHER PUBLICATIONS

Written Opinion for PCT/US2016/028528 dated Aug. 1, 2016, pp. 1-3.

* cited by examiner

METHOD TO REDUCE
ELECTROMAGNETIC INTERFERENCE IN
SWITCHING CIRCUIT APPLICATIONS

This is a § 371 entry of PCT/US2016/028528, filed Apr. 20, 2016, and claims the benefit of U.S. provisional application No. 62/149,734, filed Apr. 20, 2015, all of which are incorporated herein by reference.

This application claims the benefit of priority of U.S. provisional patent application 62/149,734, filed Apr. 20, 2015, the content of which is incorporated herein by reference in its entirety.

TECHNICAL FIELD

The present disclosure relates generally to methods for reducing Electro Magnetic Compatibility (EMC) emissions in switching circuits, particularly those involved in electric motor driven applications. Clutch and gear shifting actuators, pumps, among others, benefit from the methods described herein.

BACKGROUND

Electric motors are an increasing occurrence in vehicular and industrial applications. Common electric motor applications rely upon a Pulse Width Modulated (PWM) inverter bridge switching circuit, controlling the current supplied to each phase of a motor by opening and closing switches, resulting in revolution of the motor. Changes in pulse duration affect the power supplied to the load. In an ideal circuit, multiple instances of the same component would be identical and noiseless, and the currents and voltages supplied would be predictable and reliable. In real-life applications, however, this is unlikely. Circuit components react to stimulus, operating environment, and construction variations in ways that can result in variations in performance among seemingly similar components, and switches are known to suffer from arcing and "bounce" which results in EMC emission. When a number of switches emitting EMC noise, especially local to one another, begin to do so at the same frequency, the noise is additive and can affect other electronic components via induction, wireless signal interference, and more.

Some applications for PWM frequency selection to prevent harmonic EMC emission rely upon additional circuit components or varied layouts, which can increase the size or complexity of the control circuit. Still others assign PWM frequencies but make changes constantly, without consideration of the overall operating environment or system.

SUMMARY

A method for providing electromagnetic compatibility to a motor control circuit is provided. A base pulse width modulated signal is selected to apply to a motor control circuit, and comprises a duty cycle for controlling an affiliated motor. Sensed system conditions are inputted for selecting a hopping frequency and a hopping amplitude of an electro magnetic compatibility management signal. The hopping frequency and the hopping amplitude are overlayed on to the base pulse width modulated signal to create a control pulse width modulated signal. The hopping frequency dithers the frequency of the control pulse width modulated signal. The hopping amplitude restricts the amplitude of the frequency dither.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

PWM (Pulse Width Modulated) switching in an inverter bridge relies on a carrier frequency, within which is encoded the on/off switching signal that controls each phase of the electric motor. Controlling the PWM switching controls the torque delivered by the electric motor which in turn controls the speed of the electric motor. A motor has a voltage at which it operates, whether by battery or other supply SUPPLY. The average voltage applied to the motor winding is obtained by turning on and off the appropriate switches using controlled duty cycles.

Figure 1:
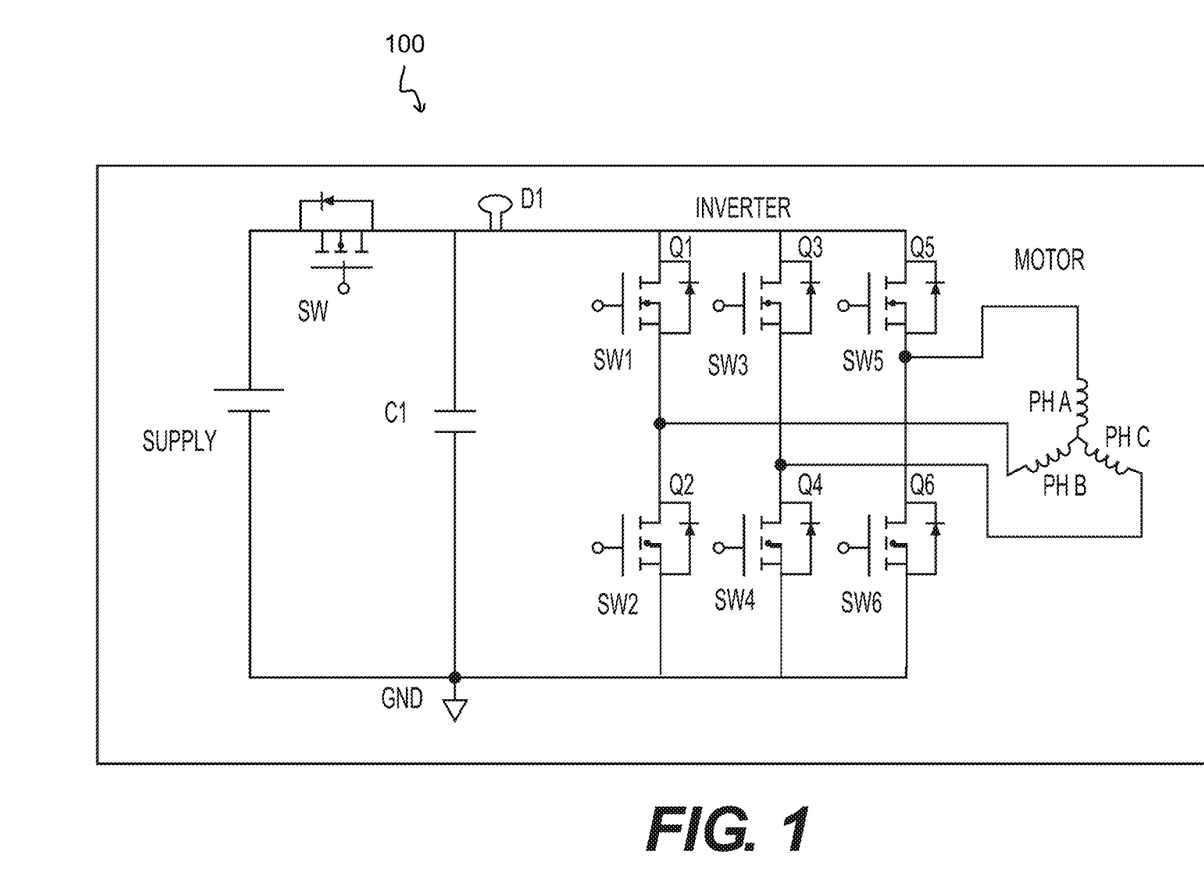
FIG. 1 is an example of a printed circuit board layout.

An exemplary circuit is shown in FIG. 1. The supply SUPPLY is protected by a reverse battery protection switch SW, which could alternatively be a diode based circuit. A capacitor C1 spans between the high and low sides of the circuit, and a ground GND is included. A detector D1 is included to sense the DC Bus Current. An exemplary inverter bridge INVERTER comprises subcircuits Q1, Q2, Q3, Q4, Q5, Q6, that further comprise controllable switches SW1, SW2, SW3, SW4, SW5, SW6. The inverter bridge is responsible for receiving the voltage and converting it to motor control current I applied to the coils PH A, PH B, PH C of the motor MOTOR. The principles described herein can be applied to other inverter bridges and other electric coil motors, such as motors have more or less than three phases, such as 2-phase or 5-phase motors.

When several signals of the same carrier frequency apply switching commands to the inverter bridge in a harmonic manner, the aforementioned EMC emission can occur; this effect is compounded as more switches activate in resonance. This can be ameliorated by making variations to the PWM carrier frequency that supplies the on/off switching signal between the switches in the circuit, provided that the PWM frequencies are carefully chosen to result in a consistent output current/voltage in each phase of the motor, as appropriate for the desired torque and speed.

This application of PWM frequency modulation relies on the programmable nature of a controlling microprocessor to assign PWM values based on known characteristics of the broader system. The motor control PWM is overlaid with an EMC management signal. The EMC management signal is based on characteristics of the broader system to avoid a galloping PWM that has little to do with the realities of the system. By tying the EMC management signal to the broader system, EMC non-compliance in specific operation ranges can be targeted.

Therefore, an improved method for PWM frequency assignment to electric motor switching circuits in larger systems with known operational characteristics can be obtained by using microprocessors to assign PWM frequencies optimized to the various modes of operation of the system. For example, a mode can be an open mode or closed mode, as for a clutch. Or, a mode can be an idle or maximum speed for a pump. Modes between open or closed, idle or maximum, are also contemplated for stepped applications.

This application pertains to the use of this assignment technique in the operation of clutch controls in motor vehicles, where PWM duty cycles can be assigned based on clutch position, vehicle velocity or acceleration, or motor torque. The EMC management signal can be applied to clutches, such as a transmission shift-control clutch, an electronic limited slip differential (eLSD), Power Take-Off wet clutch or dry clutches, etc. can be controlled. Simple open and close applications can be controlled, as well as systems having positions selectable between open and close. The application is not limited to automotive clutches. The EMC management signal can also be applied to pumps, such as superchargers, turbines, and other motor-controlled applications.

Many methods for Electro-Magnetic Compatibility (EMC) emission reduction have been proposed but the use of programmable microprocessor controllers presents an opportunity to extend and improve the emission reduction methods to better suit motor vehicle applications. By improving the logic applied to a clutch-control circuit, it is possible to avoid lengthy and costly circuit re-design, while improving circuit performance. EMC management signal reduces average EMC emissions over the operating cycle of the circuit.

Normally, a motor control circuit is running at a fixed frequency, for example, 20 or 25 KHz. One method proposes that instead of running the circuit at the fixed frequency, frequency hopping is instituted to dither the frequency and so adjust the cycle speed of the EMC management signal. The pulse width modulation (PWM) frequency is modified in a triangular fashion over a selected operation condition. The switches SW1-SW6 open and close at a hopping frequency HF_1 for a period of time and the hopping frequency HF_1 disrupts the ability of the circuit to have deleterious resonance and EMC.

Figure 2:
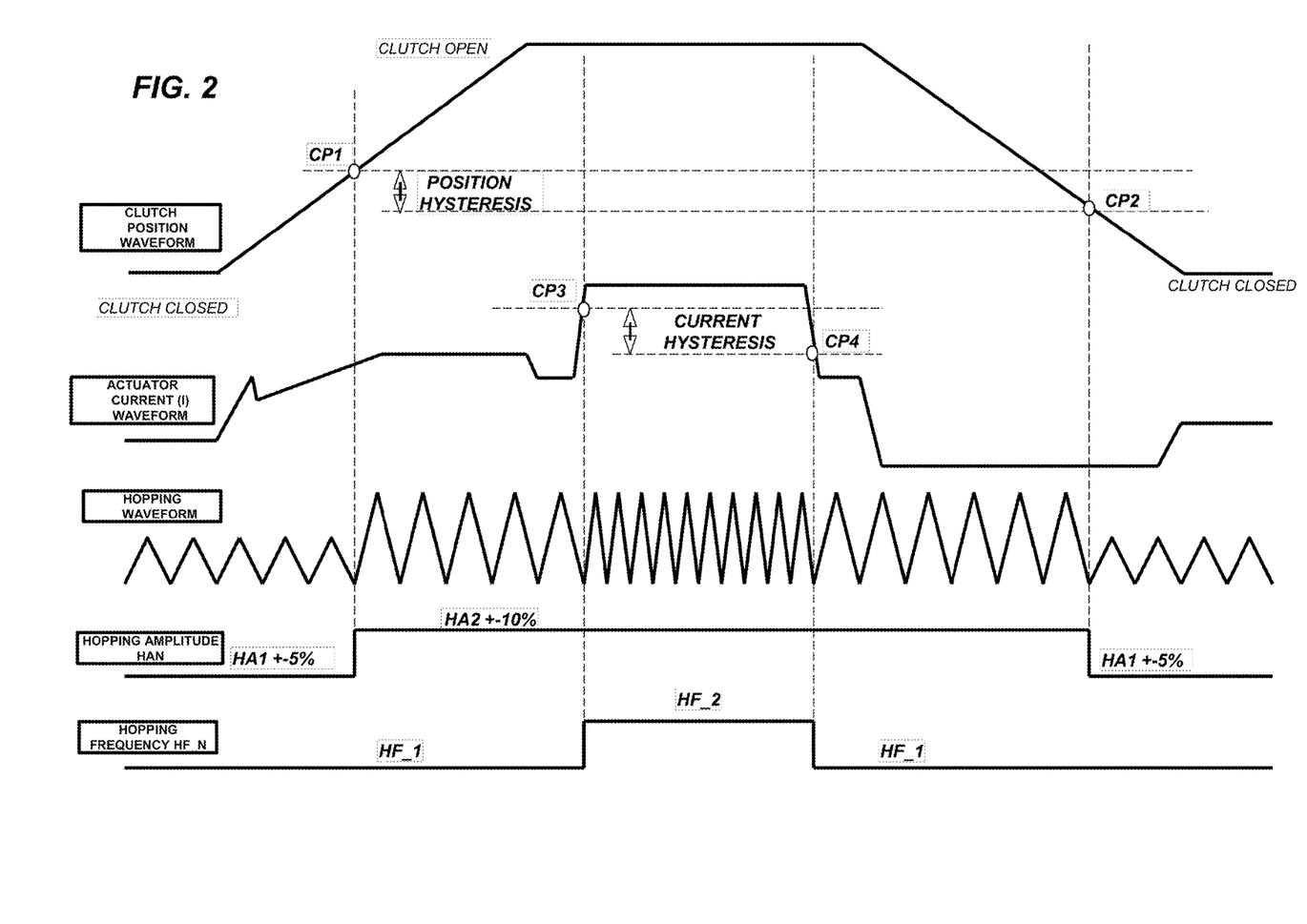
FIG. 2 is an exemplary waveform comparison for a servo application for a clutch system.

In select operating conditions, a second hopping frequency HF_2 is implemented, and the switches SW1-SW-6 open and close at a different cycle speed. In the example of FIG. 2, hopping frequency HF_1 is used when the clutch is closed and until the motor current I rises especially high, as shown on the actuator current waveform. A high current on the clutch motor triggers the need for greater EMC management, and the second hopping frequency HF_2 is used above a current hysteresis threshold. The clutch is in a commanded open position, but the current has risen to predictably difficult EMC levels. When the current drops below a second current hysteresis threshold, the second hopping frequency HF_2 is discontinued, and the first hopping frequency HF_1 resumes. The current hysteresis thresholds are system conditions that are collected, stored, and analyzed by the ECU 500, and as such, are control points CP3 & CP4. Additional or alternative system conditions can be collected in the memory of the ECU 500. For example, a time t can be collected and stored so that a control point CP1, CP2, CP3 or CP4 can be based on an elapsed time from a control command, instead of a hysteresis value. The control command can be, among others, a clutch position, a torque command, etc. The hopping waveform shows that during hopping frequency HF_1, the signal cycles from peak to peak at the same rate, but the second hopping frequency HF_2 cycles from peak to peak more rapidly. Dithering the frequency variation via the frequency hopping prevents the circuit from sitting at a resonance point.

Higher currents benefit from the frequency hopping, and the condition-specific hopping here permits the use of strategies specific to the aggressive conditions. This deviates from prior techniques, where frequency modifications gallop haphazardly to and fro, without directly, or purposefully, addressing the most difficult operating conditions. In the instant disclosure, a subset of EMC management signals can be selected and tailored for the most difficult control conditions, and another subset of EMC management signals can be tailored for less difficult control conditions.

The PWM frequency can change to avoid any resonance point. Since the EMC emissions arise when the circuit sits at one resonance point, the frequency variation prevents the EMC emissions from arising. The rate at which the frequency is adjusted is controlled by the hopping frequencies HF_1 & HF_2 and impacts the rate of the EMC management signal.

A second aspect impacts the amplitude of the EMC management signal. A hopping amplitude waveform is shown in FIG. 2. A first hopping amplitude HA1 of +/−5% is shown, with a condition-specific switch to a higher hopping amplitude HA2 of +/−10%. When a condition is satisfied, the hopping amplitude returns from HA2 to HA1. In FIG. 2, a position hysteresis condition determines the switch from hopping amplitude HA1 to HA2. The position hysteresis can be the lag between a commanded clutch closed position and a commanded clutch open position, where the clutch position does not yet match the commanded position. In hopping amplitude HA2, the circuit ramps back and forth from 18 KHz, to 22 KHz, back to 18 KHz. The average PWM frequency is 20 KHz, which would have been the constant, fixed frequency without the EMC management signal.

At hopping frequency HA_1, the EMC management signal ramps from 19 KHz, to 20 KHz, to 21 KHZ, and back at hopping frequency HF_1, which is slower than hopping frequency HF_2. At hopping amplitude HA2 and hopping frequency HF_2, the EMC management signal ramps from 18 KHz, to 22 KHz, back to 18 KHz at a higher rate. The combination of frequency and amplitude hopping gives greater EMC management. Overlapping amplitude and frequency adjustments provides greater variation to the ultimate hopping waveform, so that combinations of amplitude and frequency adjustments can be made for specific operating conditions. So, a highway operating condition could have a first hopping waveform for ramping between clutch open and clutch closed positions, but an off-road or low load condition could have a second hopping waveform to deal with vibration and engagement speed conditions that differ from the highway application. A selection strategy can be combined with system sensors to overlay the EMC control methods.

Figure 3:
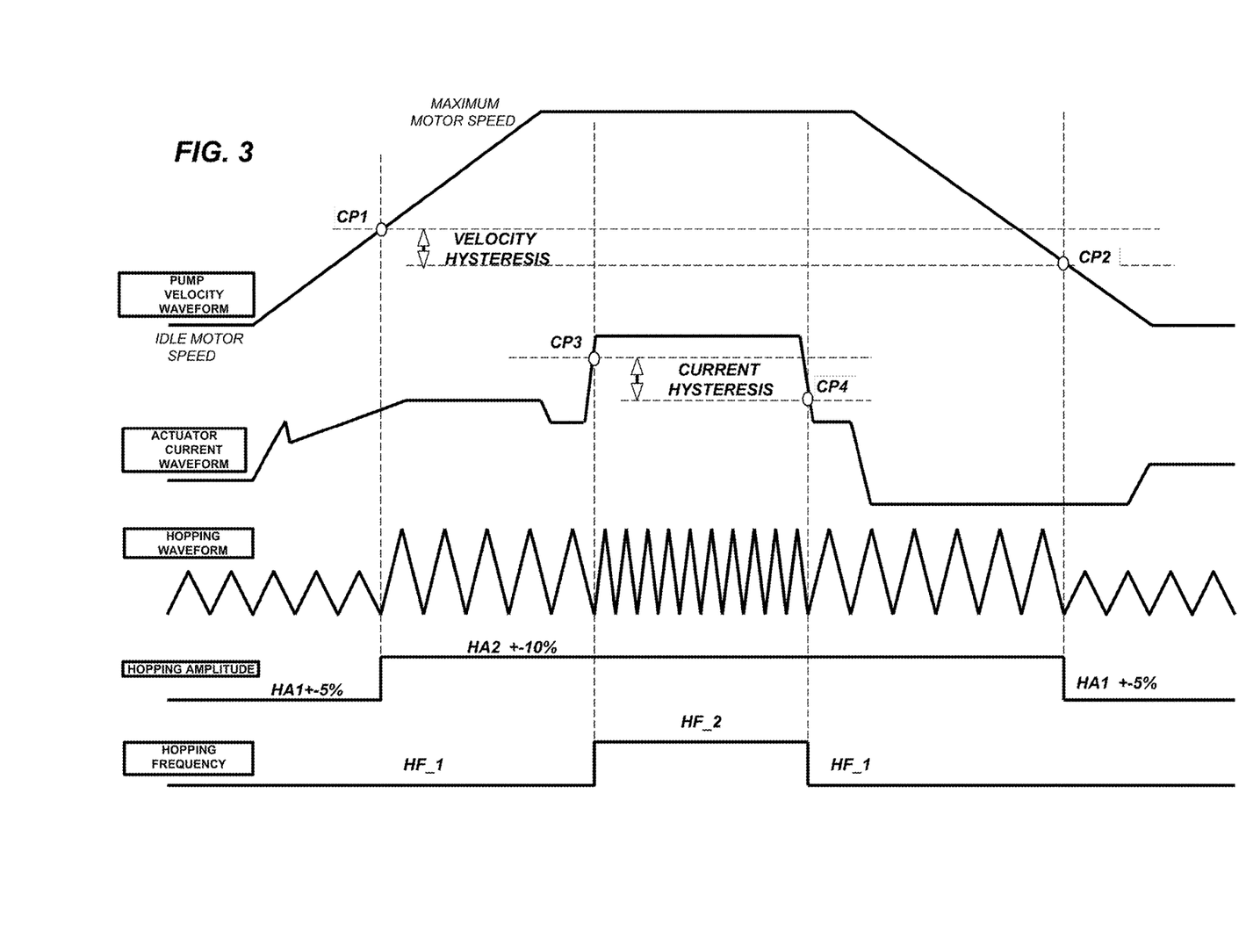
FIG. 3 is an exemplary waveform comparison for a velocity control application for a pump system.

FIG. 3 applies the hopping waveform to the velocity control of a pump. A low hopping frequency HF_1 is selected during idle pump operation. Until the current rises above a current hysteresis threshold (control point CP3), it is not necessary to increase the rate at which the EMC management signal changes to hopping frequency HF_2. But, the hopping amplitude shifts from HA1 to HA2 when the pump transitions from the low idle motor speed to a motor speed where velocity hysteresis is encountered. The velocity hysteresis becomes a control point, CP1, and can be sensed by the system for analyzation and action within the ECU 600. Adding velocity hysteresis to the hopping amplitude selection can ensure smoothness by reducing potential "chattering" of the hopping amplitude due to noise or rapid changes in the velocity signal. When the current drops below a second current hysteresis threshold (control point CP2), the hopping frequency returns to HF_1 from HF_2, and, when the velocity of the pump returns below a second velocity hysteresis threshold, the hopping amplitude steps down from HA2 to HA1. When finer pump control is needed, as for the clutch, additional hopping amplitudes HAN and additional hopping frequencies HF_X can be instituted to deal with additional hysteresis points associated with the finer control points. Additional or alternative system conditions can be collected in the memory of the ECU 600. For example, a time t can be collected and stored so that a control point CP1, CP2, CP3 or CP4 can be based on an elapsed time from a control command, instead of a hysteresis value. The control command can be, among others, a pump velocity, a flow rate, etc.

The method comprises initializing a PWM counter in the control logic at system start-up. A PWM register comprises readable values of the fixed frequencies needed to operate the control circuit. The fixed frequencies can correspond to the frequencies at which a motor would run to operate an electronic clutch actuator. That is, an electronic clutch actuator requires a certain fixed frequency in order to operate the clutch in a particular position. And so, when a clutch position is selected or implemented, the fixed frequency of the circuit is updated to supply that clutch position. A selective variable frequency method is utilized to change the PWM frequency to avoid negative radiative emissions. The variable frequency method is based on the amount of current supplied to the clutch. The amount of current translates to the clutch applied to the torque. The control logic can convert torque requests to frequency requests, or can convert current requests to frequency requests, or both, so that driver input and system device inputs are properly integrated in to a responsive control methodology.

In one example, when the clutch is in a closed position, for example, highway driving in higher gears, the rate of the PWM frequency change can be lower than off-highway driving clutch positions.

To constantly change the frequency is burdensome, however, and so one control strategy institutes the frequency variation only when the circuit is operating in a particular mode. So, modes that are particularly susceptible of EMC emissions receive control logic to vary the frequency, where other modes operate with a fixed frequency.

The techniques are applied to a control circuit for an electric clutch actuator (ECA). The electro-magnetic compatibility of the clutch control circuit is improved so that the circuit better handles inductive emissions and radiative emissions, and so that the circuit has better radiative immunity to function despite emissions from other circuits.

While electric clutches are contemplated, hydraulic clutches are also contemplated, as the pump that supplies the hydraulic actuation can be controlled by the methods disclosed herein. Wet clutches, dry clutches, limited slip differentials, etc. are all possible clutches for control. Hydraulic control systems, boosters such as superchargers, and other pumps are also contemplated. The methods and control aspects can be applied to DC motors, brushless motors, multi-phase motors and other electronically controlled motor products.

The printed circuit board (PCB) layout of FIG. 1 can follow industry best practices. One sample PCB layout is shown in FIG. 1. Using the layout avoids expensive circuit re-design, though other PCB layouts can be used with the methods and control aspects disclosed herein.

Pulse width modulation (PWM) is applied to the circuit. All switches receive control signals to open and close at the selected frequency. So, switches in sub-circuits Q1, Q2, . . . Q6 open and close at a frequency of, for example 20 KHz for a preselected mode of operation. In a second preselected mode of operation, the frequency ramps back and forth at an interval of, for example +/−10%, which would be from 18 KHz, to 22 Khz, back to 18 KHz. The average frequency is 20 KHz. In a third mode of operation, the frequency ramps back and forth at a different rate, for example +/−5%, which would be from 19 KHz, to 21 Khz, back to 19 KHz. The average frequency is still 20 KHz.

In another aspect, instead of being dependent on the mode of operation, the frequency ramping can be time-dependent so that, every few milliseconds, the percentage of frequency fluctuation changes.

Figure 4:
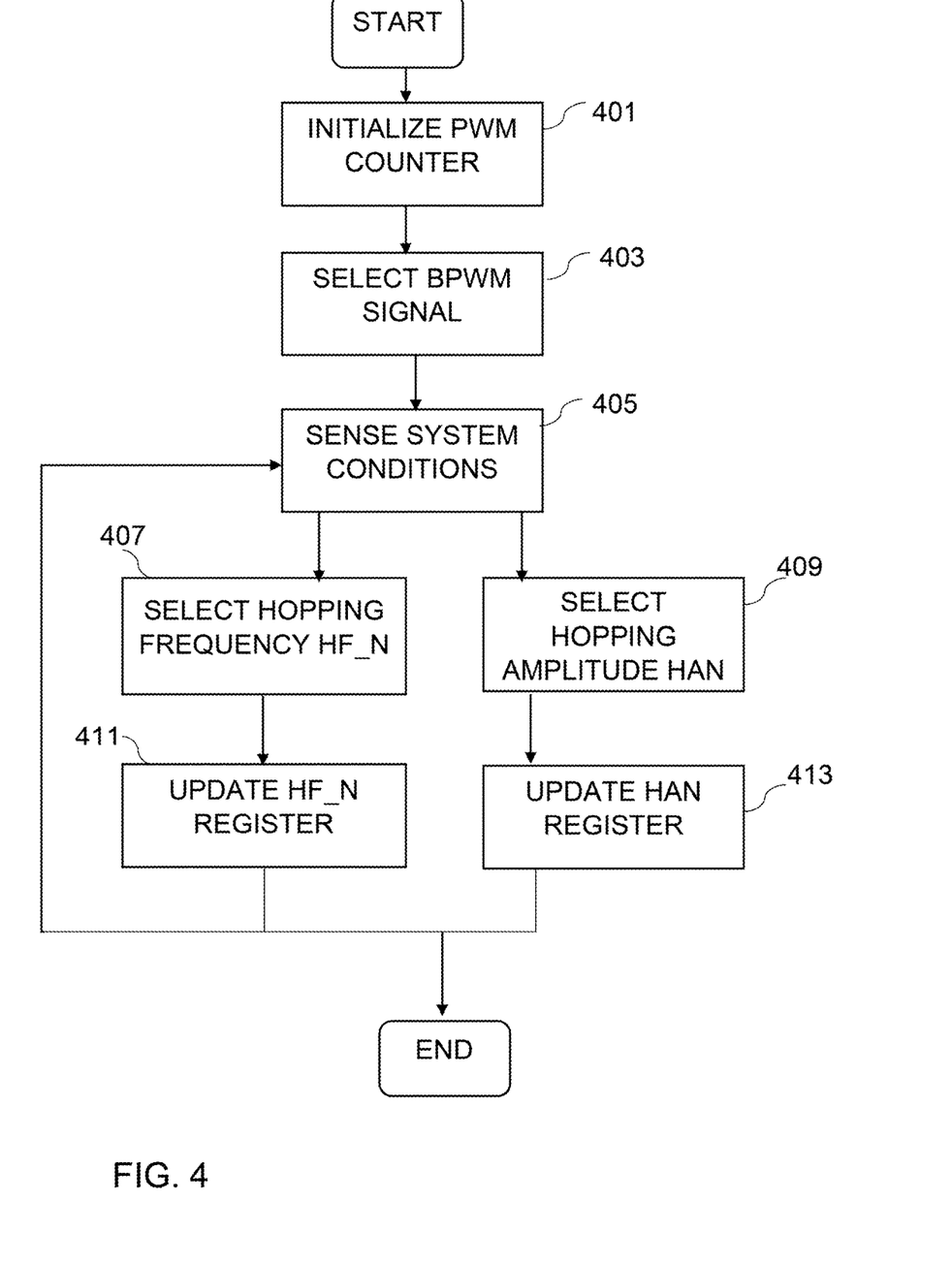
FIG. 4 is a flow diagram of an EMC management method.

FIG. 4 outlines a method for providing electromagnetic compatibility to a motor control circuit 100. At system start-up, PWM counters are initialized in step 401. A base pulse width modulated signal BPWM is selected to apply to a motor control circuit in step 403. The base pulse width modulated signal BPWM comprises a duty cycle for controlling an affiliated motor. System conditions are sensed in step 405, and inputted to the memory of an electronic control unit (ECU). A hopping frequency is selected in step 407. A hopping amplitude is selected in step 409. A register of hopping frequencies HF_N is updated with the initial hopping frequency HF_1 in step 411. A register of hopping amplitudes HAN is updated with the initial hopping amplitude HA1 in step 413. The hopping amplitude HAN and hopping frequency HF_1 form an electro magnetic compatibility (EMC) management signal. The hopping frequency HF_1 and the hopping amplitude HAN are overlayed on to the base pulse width modulated signal BPWM to create a control pulse width modulated signal CPWM. The hopping frequency HF_1 dithers the frequency F of the control pulse width modulated signal CPWM. The hopping amplitude HA1 restricts the amplitude A of the frequency dither.

The method iterates to step 405 to check for control points in the system conditions that would trigger adjustments to the hopping frequency, the hopping amplitude, or both. Should a new mode of system or motor operation be selected, this will adjust the sensed system conditions, and so an updated EMC management signal can be selected and overlayed. If necessary, the new mode of system operation can trigger the selection of an update to the duty cycle of the base pulse width modulated signal. This, too, will be a sensed system condition.

The method can further comprise sensing the inputted sensed system conditions to sense a condition at a control point; and switching one or both of the hopping frequency and the hopping amplitude of the electro magnetic compatibility management signal in response to the sensed condition at a control point.

The method can comprise sensing the inputted sensed system conditions to sense a condition at a second control point. Sensing the second control point condition triggers returning one or both of the hopping frequency and the hopping amplitude to the hopping frequency and the hopping amplitude of the electro magnetic compatibility management signal applied to the base pulse width modulated signal.

It is possible to switch the duty cycle of the base pulse width modulated signal to switch a motor operation mode from a first mode to a second mode. And, it is possible to switch one or both of the hopping frequency and the hopping amplitude of the electro magnetic compatibility management signal in response to the switched duty cycle.

Sensing the inputted sensed system conditions can comprise sensing a condition at a control point; and switching one or both of the switched hopping frequency and the switched hopping amplitude of the electro magnetic compatibility management signal in response to the sensed condition at a control point.

Dithering the frequency of the control pulse width modulated signal can comprise ramping the frequency of the motor control circuit operation in a triangular fashion over time. The hopping amplitude restricts the frequency dither to +/−10% of the base pulse width modulated signal frequency, and can restrict the frequency dither to +/−5% of the base pulse width modulated signal frequency.

Inputted sensed system conditions can comprise one or more of a clutch current hysteresis and a clutch position hysteresis, a DC BUS current of the motor control circuit, a velocity hysteresis and a current hysteresis of a pump. The inputted sensed system conditions can additionally or alternatively comprise one or more of a clutch position, a clutch torque command, a clutch pressure, a motor speed, a motor current, and an elapsed time at the control pulse width modulated signal. The inputted sensed system conditions can additionally or alternatively comprise one or more of a velocity of a pump, a flow rate through a pump, a fluid pressure output from the pump, a fluid pressure of a fluid input to the pump, a motor speed, a motor current, and an elapsed time at the control pulse width modulated signal.

Figure 5A:
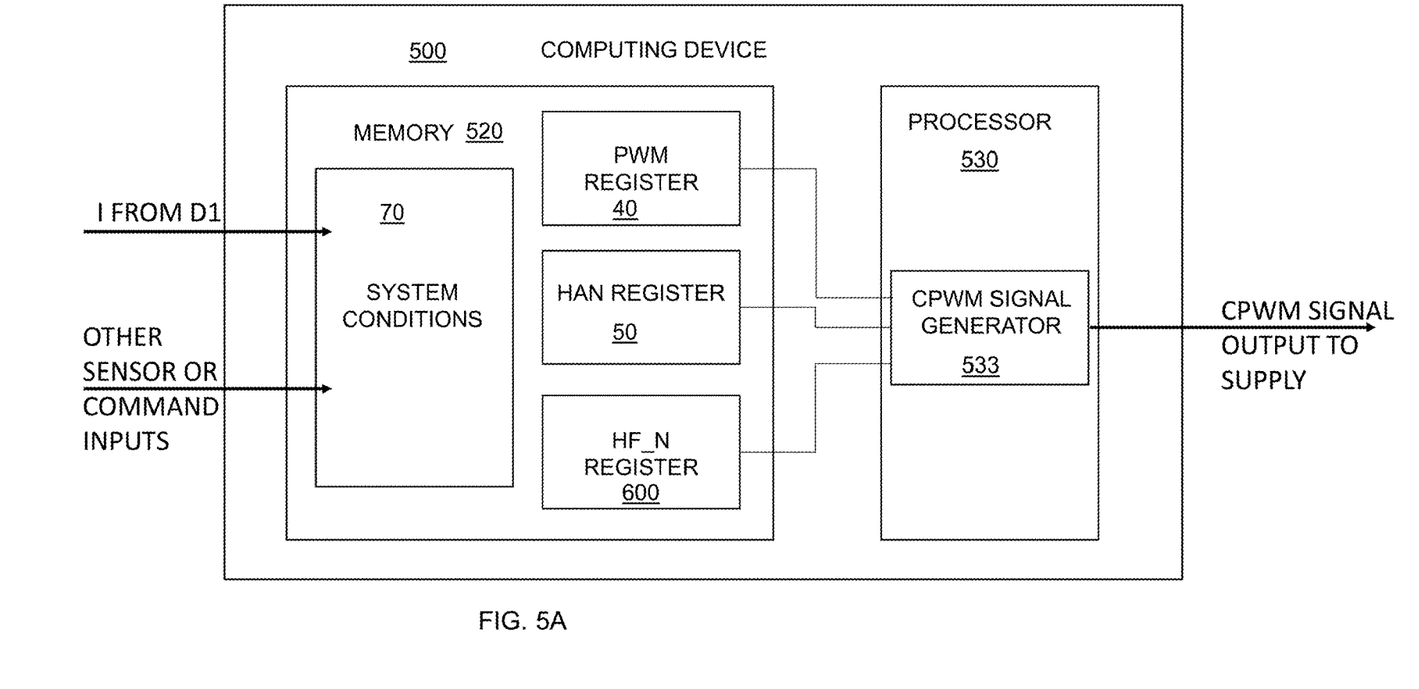
FIGS. 5A & 5B are schematics of an exemplary computing device.
Figure 5B:
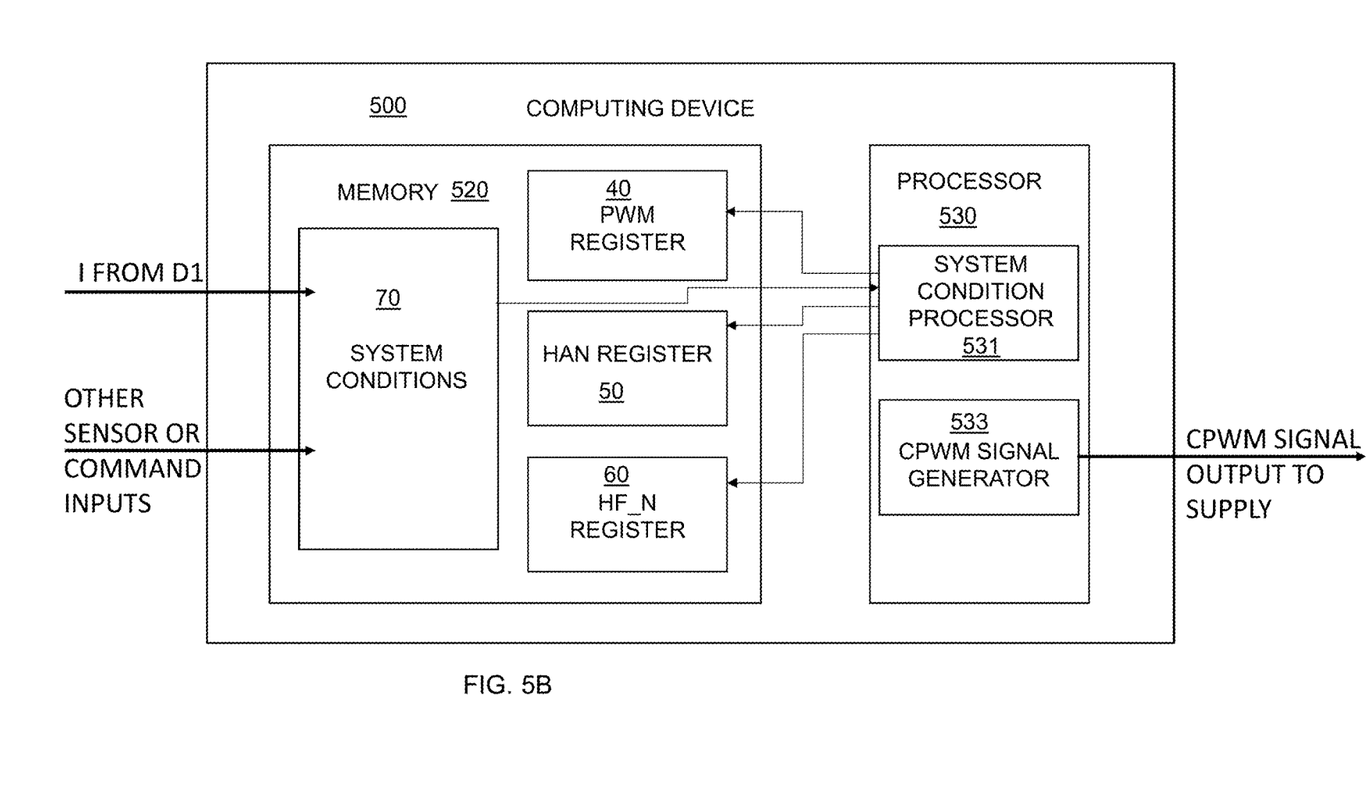

It is necessary to provide computer control to apply the methods herein to the disclosed control circuit 100. So, an appropriate computing device 500, such as an electronic control unit (ECU), programmable chip, or on-board computer is needed to interface with overall system and disclosed control circuit 100. The methods disclosed herein can be incorporated in to a computer program product, which may comprise a tangible storage medium (memory device) 520 and a program stored on the storage medium. The program, when executed by a processor 530 of the computing device, implements the methods disclosed herein. The memory device 520 can be a FLASH, ROM, RAM or other tangible storage device for storing processor-readable instructions which, when executed by a processing device 530, cause the processing device to perform the disclosed methods. The computing device 500 can compare processed and received data, pull stored predetermined data from the memory device 70, push received data to the memory device for storage, update stored memory data and instructions, and make determinations of system conditions.

In one aspect, it is possible to implement a computing device 500 comprising registers and counters. At system start-up, it is possible to initialize a pulse width modulation counter in a pulse width modulation register 40. A duty cycle register 45 can be included to track the duty cycle applied to the pulse width modulated signal, whether base or control PWM signal. The selected hopping frequency HF_1 can be stored as a base hopping frequency in a hopping frequency register 50. The selected hopping amplitude HA1 can be stored as a base hopping amplitude in a hopping amplitude register 60. As the hopping frequency completes a dither cycle, or as updates are made to the hopping frequency in response to sensed system conditions, the pulse width modulation counter can be updated. Likewise, the hopping frequency register 50 can be updated as the hopping frequency dithers. And, the hopping amplitude register is updated as the hopping amplitude 60 changes.

Counters and registers assist with tracking the values applied to the control circuit 100 and provide pull-down data for calculating or controlling next steps and next signals in the method application. The registers can serve as lookup tables (LUTs) for the processing device of the computing device. The registers can be reactive to the CPWM signal generated, updating the registers after the CPWM signal has been generated. This is shown in FIG. 5A. Or, as shown in FIG. 5B, the processor can include an additional processing subroutine or subcomponent, system condition processor 531, for processing the system conditions so as to choose the register values. Once the register values are chosen, the CPWM signal generator 533 generates the CPWM signal to output to the supply according to the connectivity shown in FIG. 5A. Other computing device layouts can be used to implement the aspects of this disclosure.

A system condition storage area 70 can comprise a register or other storage and tracking compartmentalization for specific sensed values of the above inputted sensed system conditions. The conditions can be sensed by sensors, or gathered from command signals sent to the system at large. Alternative timer and clock storage and processing can track elapsed times and support the registers. The duty cycle can also be tracked by register or other storage to track the macro-behavior applied to the motor.

The processing device 530 can receive data from the PWM register 40, the hopping amplitude register 50, and the hopping frequency register 60. The processor creates the control pulse width modulated CPWM signal that is applied to the supply SUPPLY of the motor control circuit 100 in CPWM signal generator 533.

Figure 6:
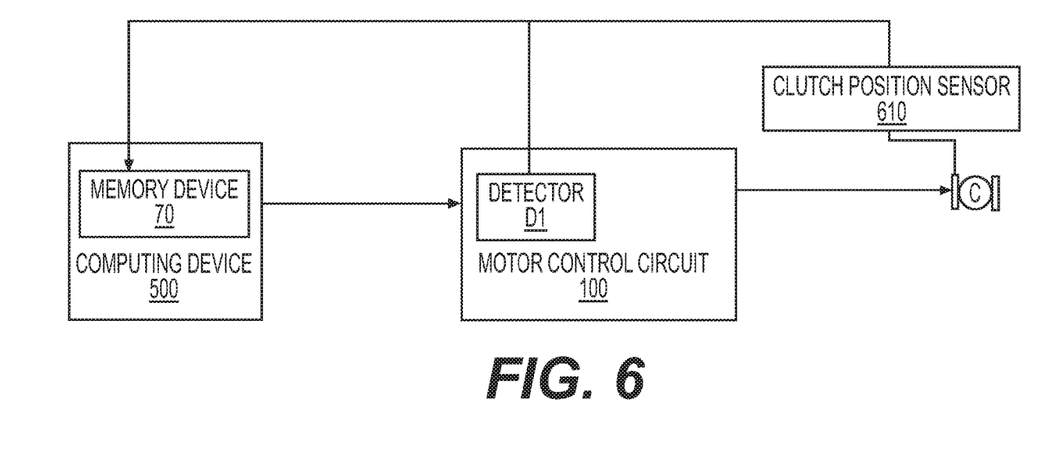
FIG. 6 is a schematic of an exemplary clutch system.
Figure 7:
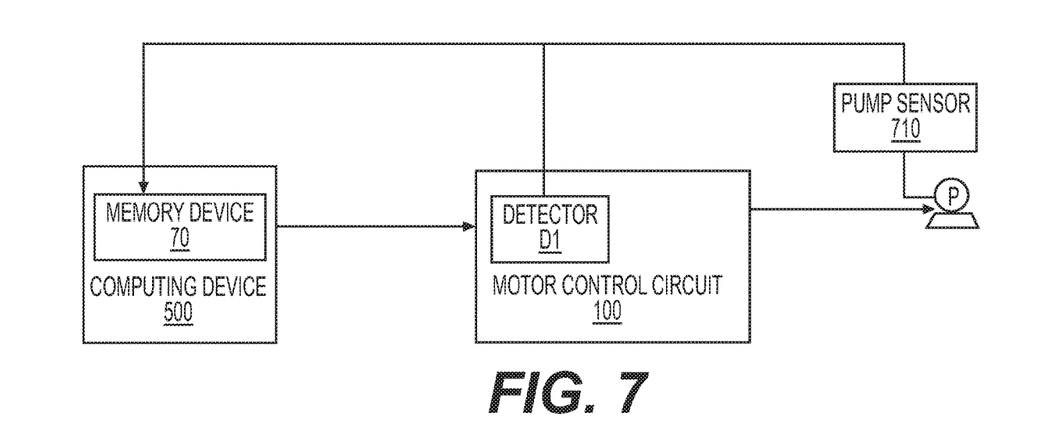
FIG. 7 is an alternative schematic of an exemplary pump system.

FIGS. 6 and 7 provide exemplary system layouts. FIG. 6 provides a system layout for a clutch, while FIG. 7 provides a system layout for a pump.

The motor control circuit 100 controls the motor affiliated with clutch C or pump P. A clutch position sensor 610 can track the position of one or more clutch gripping surface, and relay the sensed position back to the computing device 500 for storage in the system condition register or system condition storage area 70. Likewise, pump sensor 710 can sense pump velocity or other system condition and relay the sensed position back to the computing device 500 for storage in the system condition register or system condition storage area 70. The system condition(s) sensed can be combined with the DC BUS current sensed by detector D1.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. Other embodiments will be apparent to those skilled in the art from consideration of the specification and practice of the disclosure.

We claim:

1. A method for providing electromagnetic compatibility to a motor control circuit, comprising:
    selecting a base pulse width modulated signal (BPWM) to apply to a motor control circuit, the base pulse width modulated signal comprising a duty cycle for controlling a motor affiliated with the motor control circuit;
    inputting sensed system conditions;
    selecting a hopping frequency and a hopping amplitude of an electro magnetic compatibility management signal based on the sensed system conditions; and
    overlaying the hopping frequency and the hopping amplitude on to the base pulse width modulated signal to create a control pulse width modulated signal (CPWMS),
    wherein the hopping frequency dithers the frequency of the control pulse width modulated signal, and
    wherein the hopping amplitude restricts the amplitude of the frequency dither.

2. The method of claim 1, wherein dithering the frequency of the control pulse width modulated signal comprises ramping the frequency of the motor control circuit operation in a triangular fashion over time.

3. The method of claim 1, comprising restricting the frequency dither to +/−10% of the base pulse width modulated signal frequency.

4. The method of claim 1, comprising restricting the frequency dither to +/−5% of the base pulse width modulated signal frequency.

5. The method of claim 1, wherein inputted sensed system conditions comprise one or more of a clutch current hysteresis and a clutch position hysteresis.

6. The method of claim 1, wherein inputted sensed system conditions comprise a DC BUS current of the motor control circuit.

7. The method of claim 1, wherein inputted sensed system conditions comprise one or more of a velocity hysteresis and a current hysteresis of a pump.

8. The method of claim 1, wherein inputted sensed system conditions comprise one or more of a clutch position, a clutch torque command, a clutch pressure, a motor speed, a motor current, and an elapsed time at the control pulse width modulated signal.

9. The method of claim 1, wherein inputted sensed system conditions comprise one or more of a velocity of a pump, a flow rate through a pump, a fluid pressure output from the pump, a fluid pressure of a fluid input to the pump, a motor speed, a motor current, and an elapsed time at the control pulse width modulated signal.

10. A method for providing electromagnetic compatibility to a motor control circuit, comprising:
    selecting a base pulse width modulated signal (BPWM) to apply to a motor control circuit, the base pulse width modulated comprising a duty cycle for controlling a motor affiliated with the motor control circuit;
    inputting sensed system conditions;
    selecting a hopping frequency and a hopping amplitude of an electro magnetic compatibility management signal based on the sensed system conditions; and
    overlaying the hopping frequency and the hopping amplitude on to the base pulse width modulated signal to create a control pulse width modulated signal (CPWMS);
    sensing the inputted sensed system conditions comprising sensing a condition at a control point; and
    switching one or both of the hopping frequency and the hopping amplitude of the electro magnetic compatibility management signal in response to the sensed condition at a control point,
    wherein the hopping frequency dithers the frequency of the control pulse width modulated signal, and
    wherein the hopping amplitude restricts the amplitude of the frequency dither.

11. The method of claim 10, further comprising:
    sensing the inputted sensed system conditions comprising sensing a condition at a second control point; and
    returning one or both of the hopping frequency and the hopping amplitude to the hopping frequency and the hopping amplitude of the electro magnetic compatibility management signal applied to the base pulse width modulated signal.

12. The method of claim 10, wherein inputted sensed system conditions comprise one or more of a clutch current hysteresis and a clutch position hysteresis.

13. The method of claim 10, wherein inputted sensed system conditions comprise a DC BUS current of the motor control circuit.

14. The method of claim 10, wherein inputted sensed system conditions comprise one or more of a velocity hysteresis and a current hysteresis of a pump.

15. The method of claim 10, wherein inputted sensed system conditions comprise one or more of a clutch position, a clutch torque command, a clutch pressure, a motor speed, a motor current, and an elapsed time at the control pulse width modulated signal.

16. The method of claim 10, wherein inputted sensed system conditions comprise one or more of a velocity of a pump, a flow rate through a pump, a fluid pressure output from the pump, a fluid pressure of a fluid input to the pump, a motor speed, a motor current, and an elapsed time at the control pulse width modulated signal.

17. A method for providing electromagnetic compatibility to a motor control circuit, comprising:
    selecting a base pulse width modulated signal (BPWM) to apply to a motor control circuit, the base pulse width modulated comprising a duty cycle for controlling a motor affiliated with the motor control circuit;
    inputting sensed system conditions;
    selecting a hopping frequency and a hopping amplitude of an electro magnetic compatibility management signal based on the sensed system conditions; and
    overlaying the hopping frequency and the hopping amplitude on to the base pulse width modulated signal to create a control pulse width modulated signal (CPWMS);
    switching the duty cycle of the base pulse width modulated signal to switch a motor operation mode from a first mode to a second mode; and
    switching one or both of the hopping frequency and the hopping amplitude of the electro magnetic compatibility management signal in response to the switched duty cycle,
    wherein the hopping frequency dithers the frequency of the control pulse width modulated signal, and
    wherein the hopping amplitude restricts the amplitude of the frequency dither.

18. The method of claim 17, further comprising:
    sensing the inputted sensed system conditions comprising sensing a condition at a control point; and
    switching one or both of the switched hopping frequency and the switched hopping amplitude of the electro magnetic compatibility management signal in response to the sensed condition at a control point.

19. A method for providing electromagnetic compatibility to a motor control circuit, comprising:
- selecting a base pulse width modulated signal (BPWM) to apply to a motor control circuit, the base pulse width modulated comprising a duty cycle for controlling a motor affiliated with the motor control circuit;
- inputting sensed system conditions;
- selecting a hopping frequency and a hopping amplitude of an electro magnetic compatibility management signal based on the sensed system conditions; and
- overlaying the hopping frequency and the hopping amplitude on to the base pulse width modulated signal to create a control pulse width modulated signal (CPWMS);
- initializing a pulse width modulation counter in a pulse width modulation register;
- storing the hopping frequency as a base hopping frequency in a hopping frequency register; and
- storing the hopping amplitude as a base hopping amplitude in a hopping amplitude register,
- wherein the hopping frequency dithers the frequency of the control pulse width modulated signal, and
- wherein the hopping amplitude restricts the amplitude of the frequency dither.

20. The method of claim 19, further comprising:
- updating the pulse width modulation counter each time the hopping frequency completes a dither cycle; and
- updating the hopping frequency register as the hopping frequency dithers; and
- updating the hopping amplitude register as the hopping amplitude dithers.

* * * * *